(12) United States Patent
Paulus

(10) Patent No.: US 9,612,573 B2
(45) Date of Patent: Apr. 4, 2017

(54) METHOD FOR REMOVING GEARS

(71) Applicant: Clover Technologies Group, LLC, Ottawa, IL (US)

(72) Inventor: Joda Paulus, Chatsworth, CA (US)

(73) Assignee: CLOVER TECHNOLOGIES GROUP, LLC, Ottawa, IL (US)

( * ) Notice: Subject to any disclaimer, the term of this patent is extended or adjusted under 35 U.S.C. 154(b) by 269 days.

(21) Appl. No.: 14/214,509

(22) Filed: Mar. 14, 2014

(65) Prior Publication Data

US 2014/0259593 A1    Sep. 18, 2014

Related U.S. Application Data

(60) Provisional application No. 61/785,698, filed on Mar. 14, 2013.

(51) Int. Cl.
   *G03G 21/18* (2006.01)
   *F16H 57/00* (2012.01)

(52) U.S. Cl.
   CPC ..... *G03G 21/1857* (2013.01); *F16H 57/0025* (2013.01); *Y10T 29/4973* (2015.01); *Y10T 29/49545* (2015.01); *Y10T 29/49721* (2015.01); *Y10T 29/53* (2015.01); *Y10T 29/53987* (2015.01)

(58) Field of Classification Search
   CPC .............. B23P 11/005; G03G 21/1857; Y10T 29/4973; Y10T 29/49721; Y10T 29/53987; Y10T 29/49544; Y10T 29/49545; Y10T 29/49547; Y10T 29/49716; Y10T 29/49718; Y10T 29/49845; Y10T 29/49908; Y10T 29/49917; Y10T 29/49918; Y10T 29/49925; Y10T 29/49927
   See application file for complete search history.

(56) References Cited

U.S. PATENT DOCUMENTS

| 1,092,464 | A | 4/1914 | Watson et al. |
|---|---|---|---|
| 5,402,207 | A | 3/1995 | Michlin |
| 5,739,900 | A | 4/1998 | Isobe |
| 5,765,286 | A | 6/1998 | Sato et al. |
| 5,781,830 | A | 7/1998 | Gaylord et al. |
| 5,845,173 | A | 12/1998 | Zogg et al. |
| 5,870,654 | A | 2/1999 | Sato et al. |
| 6,157,038 | A | 12/2000 | Swain et al. |
| 6,223,010 | B1 | 4/2001 | Araki |
| 6,440,048 | B1 | 8/2002 | Bleil et al. |
| 6,615,006 | B2 | 9/2003 | Michlin et al. |
| 6,898,399 | B2 | 5/2005 | Morioka et al. |
| 7,248,814 | B2 | 7/2007 | Kawai et al. |
| 7,272,330 | B2 | 9/2007 | Harlan et al. |
| 7,630,678 | B2 | 12/2009 | Kishi et al. |
| 7,747,189 | B2 | 6/2010 | Shanun et al. |
| 2002/0028087 | A1 | 3/2002 | Higeta et al. |

(Continued)

FOREIGN PATENT DOCUMENTS

| EP | 0528568 B1 | 5/1997 |
|---|---|---|
| EP | 2230556 A1 | 9/2010 |

(Continued)

*Primary Examiner* — Sarang Afzali

(57) ABSTRACT

A method is disclosed. The method provides an assembly that comprises a first drum-cylinder having an inner periphery surface and a gear assembly, wherein a portion of the gear assembly is in contact with the inner periphery surface; and decouples the gear assembly from the first drum-cylinder by crushing at least a portion of the first drum-cylinder.

9 Claims, 18 Drawing Sheets

(56) References Cited

U.S. PATENT DOCUMENTS

| | | |
|---|---|---|
| 2002/0172528 A1 | 11/2002 | Sekine |
| 2003/0021613 A1 | 1/2003 | Koide |
| 2004/0037590 A1 | 2/2004 | Morioka et al. |
| 2007/0196130 A1 | 8/2007 | Okabe et al. |
| 2008/0008495 A1 | 1/2008 | Martin et al. |
| 2009/0162093 A1 | 6/2009 | Shanun et al. |
| 2012/0247267 A1 | 10/2012 | Wazana et al. |
| 2016/0018762 A1 | 1/2016 | Wazana et al. |

FOREIGN PATENT DOCUMENTS

| | | |
|---|---|---|
| EP | 2657777 A1 | 10/2013 |
| JP | 05088594 A | 4/1993 |
| JP | 09187820 | 7/1997 |

PRIOR ART

PRIOR ART

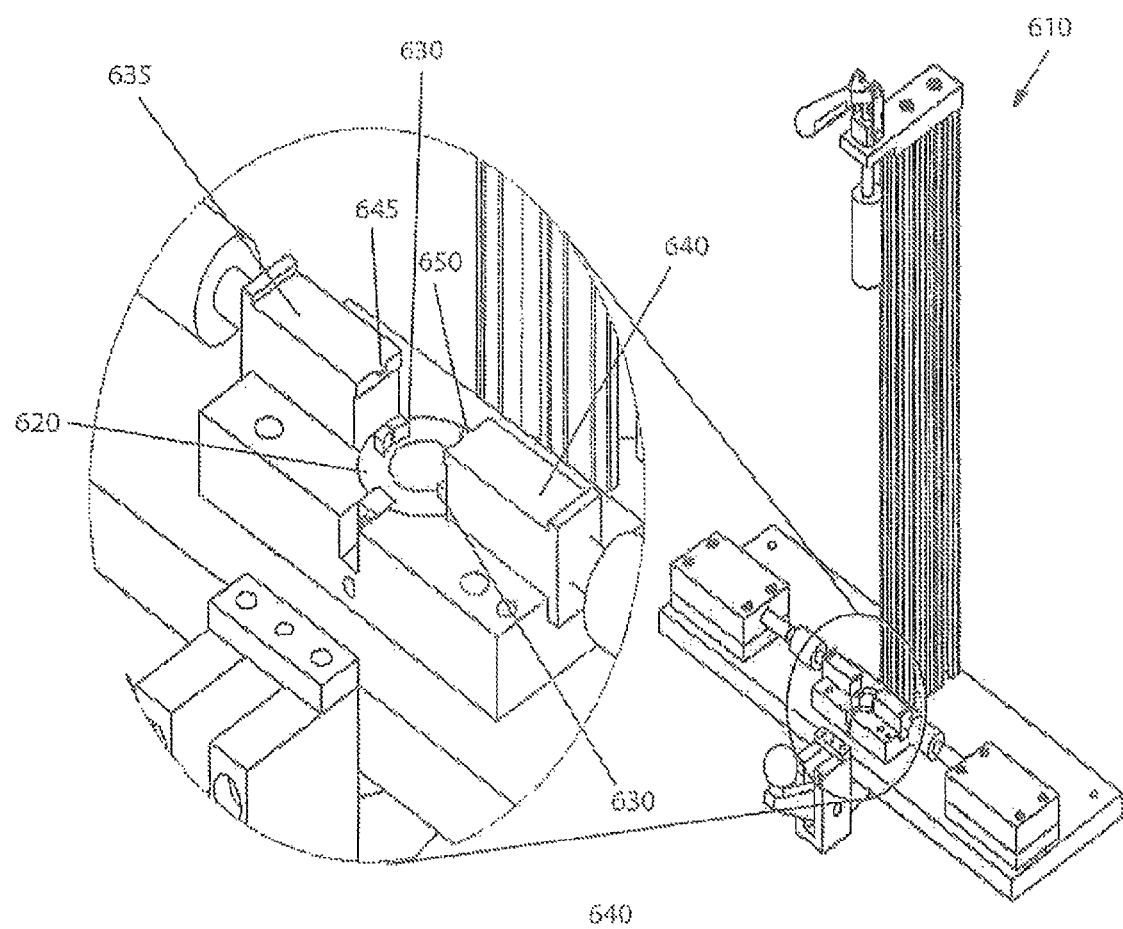

METHOD FOR REMOVING GEARS

CROSS REFERENCE TO RELATED APPLICATIONS

This application claims the benefit of U.S. Provisional Application No. 61/785,698, filed on Mar. 14, 2013, which is incorporated herein by reference in its entirety.

FIELD

The present invention relates generally to the field of laser printer toner cartridges and more specifically to the field of remanufacturing such cartridges.

BACKGROUND

A laser toner cartridge contains a few significant components that directly affect the print quality and durability over time. These significant components are all located in the development section of the cartridge. The above mentioned components are the photosensitive drum that is made of an electrically conducting material such as aluminum, the developing roller, the regulating member and the primary charge roller.

Referring to FIG. 1, as known in the art, a photosensitive drum assembly 20 also known in the art as Organo-Photo-Conductor (OPC) may include an aluminum cylinder, also known as drum-cylinder, 22 whose outer surface has been treated with anodizing and a photosensitive coating (not shown), a helical gear assembly 24 with helical teeth 26, and a helical drive gear assembly 28 with helical teeth 30.

As known in the art, during operation of a laser printer cartridge, the photosensitive drum assembly 20 rotates as its drive gear assembly 28 is rotated. Specific models of laser cartridges are known to have specific gear designs for the drive gear assembly 28. The drive gear assembly 28 is typically attached to the aluminum cylinder 22 by mechanical crimping and coupling process, such as, for example, described in U.S. Pat. No. 7,248,814. After some testing, it has been determined that an application of about 5 ft. lbs. of torque to the drive gear assembly 28 could cause the mechanical crimping and coupling process to fail and cause the photosensitive drum assembly 20 to separate from the drive gear assembly 28.

As a result of constant friction between the photosensitive drum assembly 20 and the primary charge roller (not shown), as well as friction between the developing roller (not shown) and the printed media (not shown) and the cleaning member/wiper bade (not shown) and the photoconductive coating (not shown) on the aluminum cylinder 22 typically wears off and/or degrades after the laser cartridge is has been depleted. This wearing off and/or degradation of the coating (not shown) on the aluminum cylinder 22 may in turn reduce print quality of the laser cartridge when it is remanufactured. The amount of wear and/or degradation of the coating depends on multiple factors such as, for example: type of media printed, average coverage area of the printed documents, type of toner used, type of documents printed (short: 1-2 pages or long: 100+ pages), and/or type of coating etc. To improve print quality in the remanufactured cartridges, the aluminum cylinder 22 is typically treated as an exhausted component and is replaced by a new one during the remanufacturing processes.

While the aluminum cylinder 22 may become exhausted during a single lifecycle of the laser cartridge, the photosensitive drum assembly 20's drive gear assembly 28 typically does not degrade and/or wear out with such use, and may be re-used. In order to reduce costs of remanufacturing a laser toner cartridge and to improve print quality of the remanufactured laser cartridges, and to reduce waste a need exists for a process and associated apparatus by which the drive gear assembly 28 is removed from the aluminum cylinder 22 and reused.

BRIEF DESCRIPTION OF THE FIGURES

FIGS. 6a-c and 7 depict a perspective view of an apparatus according to the present disclosure for coupling the drive gear assembly to a new photosensitive member assembly.

In the following description, like reference numbers are used to identify like elements. Furthermore, the drawings are intended to illustrate major features of embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
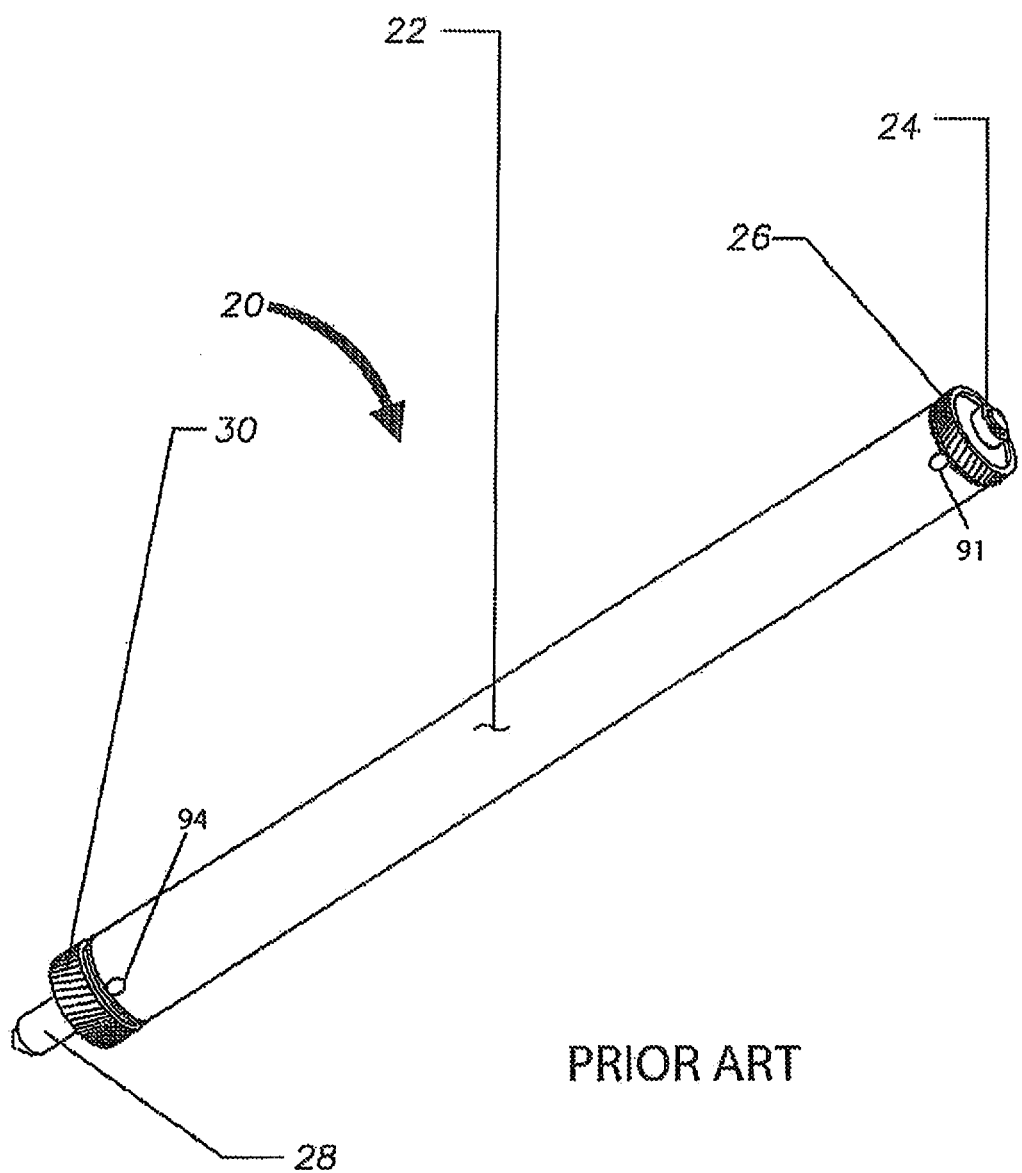
FIG. 1 depicts a perspective view of a prior art photosensitive member assembly.
Figure 2A:
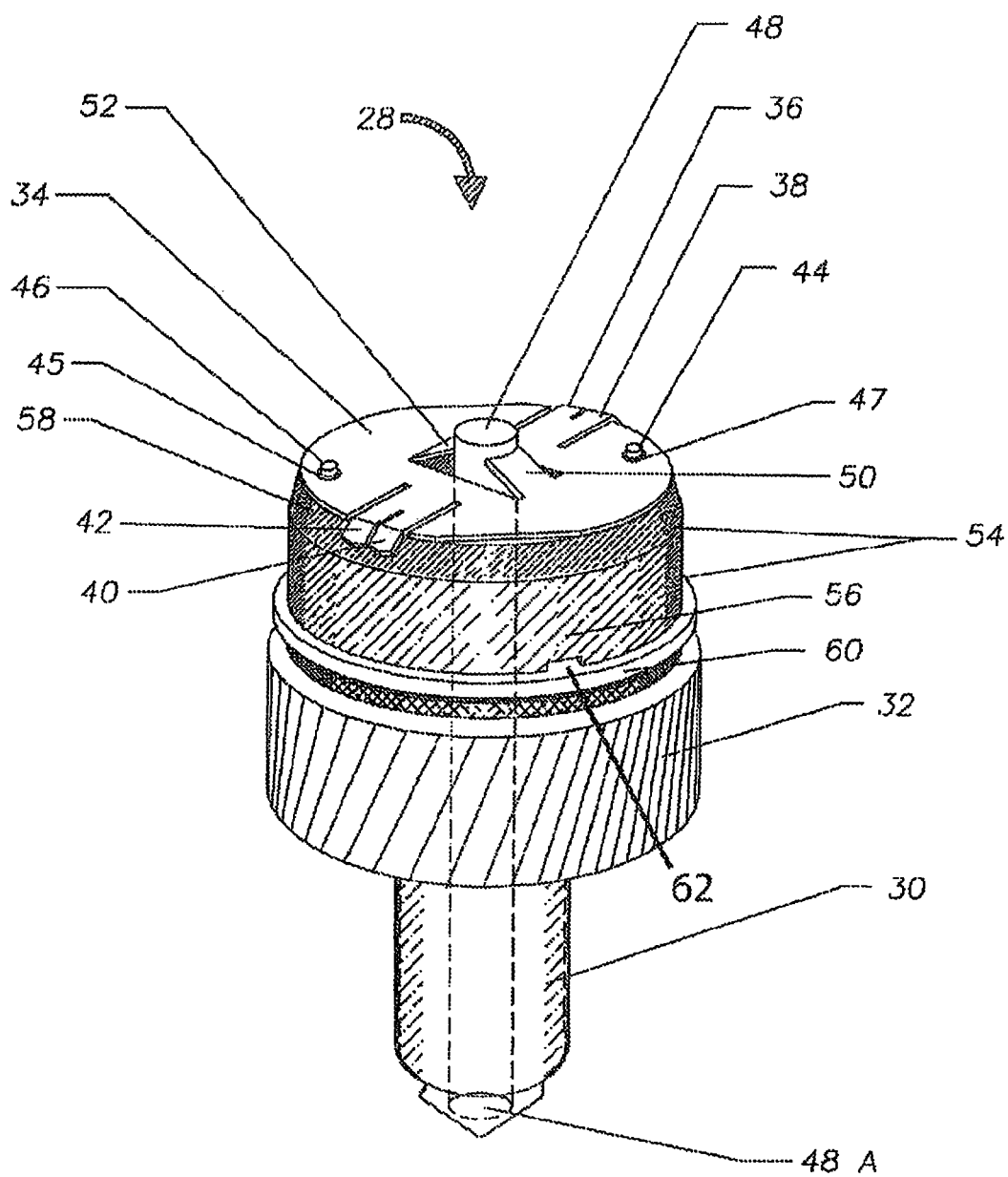
FIG. 2a depicts a perspective view of drive gear assembly as known in the art.

Referring to FIG. 2a, as known in the art, a conventional drive gear assembly 28 may include a molded helical gear 30 with helical teeth 32 as well as a metal grounding contact plate 34 in the form, for example, of a disc. The grounding plate 34 may include two opposing pairs of parallel tabs with predetermined lengths as identified by reference numbers 36, 38, 40 and 42. The parallel tabs 36, 38, 40 and 42 may be cut from the periphery of the grounding contact plate 34. The tabs 36, 38, 40 and 42 may have an end portion that is slightly bent towards the helical teeth 32 of the helical gear 30. The tabs 36, 38, 40 and 42 may be used to create a conductive path for electrical continuity between the drum-cylinder 22 shown in FIG. 1, and the drum ground contact member 48. Grounding contact plate 34 may be positioned towards the helical molded gear 30 using, for example, two holes/openings 44, 46 that may be force-fitted on dowel plastic pins 45, 47 on the helical gear 30. The pins 45, 47 may be part of the drive gear assembly 28 and may be mushroomed (heat staked) over the grounding plate 34. The ground contact member 48 may provide a path to ground for the photosensitive drum assembly 20, shown in FIG. 1, through a contact on the toner cartridge (not shown) that is in turn grounded to the printing apparatus (not shown). The grounding member 48 may be pressure fitted into the grounding plate 34 and electrically connected to the plate 34 using, for example, two leaf spring contacts 50, 52. Although the present disclosure refers to a drive gear assembly 28 with a metal grounding contact plate 34, it is to be understood that the present invention may also be applied to drive gear assemblies 28 without any metal grounding contact plates 34.

The drive gear assembly 28 may also include surfaces 54. The surfaces 54 may include a gear flange 56 and a tapered area 58, as marked in the FIG. 2a by dashed lines. The tapered area 58 may be used to guide travel of the gear into the drum-cylinder 22 shown in FIG. 1 once it is inserted into the drum-cylinder 22. In the original photosensitive drum assembly 20, the drum-cylinder 22 may be crimped to the drive gear assembly 28 using one or more tabs 94 on the drum-cylinder 22 shown in FIG. 1. It is to be understood that another tab (not shown), similar to tab 94, may be located on the opposite side of the drum-cylinder 22. The one or more tabs 94 may be bent or made to fit into one or more slots 62 in the drive gear assembly 28, as shown in FIGS. 2a and 3d. It is to be understood that another slot (not shown), similar to slot 62, may be located on the opposite side of the drive gear assembly 28. A limiting rail 60, shown in FIG. 2a, may be used as a location guide when the drive gear assembly 28 is inserted into the drum-cylinder 22, as shown in FIG. 1.

Figure 2B:
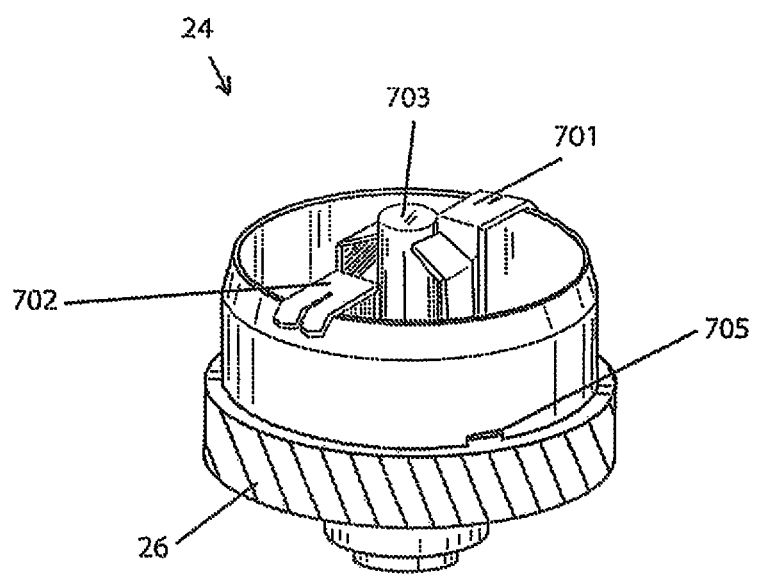
FIG. 2b depicts a perspective view of helical gear assembly as known in the art.
Figure 2C:
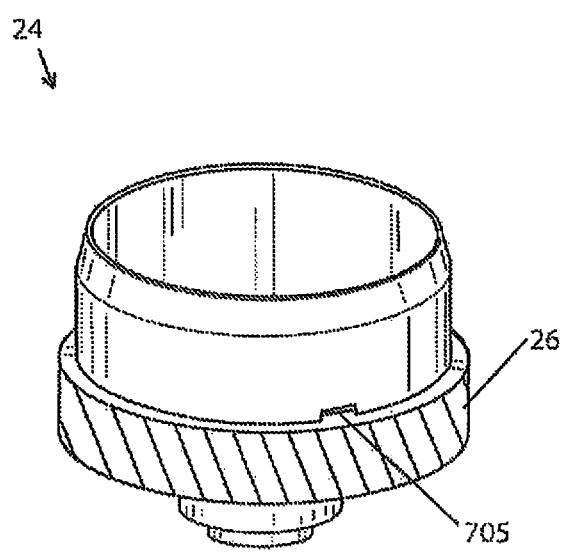
FIG. 2c depicts a perspective view of another helical gear assembly as known in the art.

Referring to FIGS. 2b-c, as known in the art, the helical gear assembly 24 may also be crimped to the drum-cylinder 22. The helical gear assembly 24 may comprise helical teeth 26, one or more openings/slots 705. The helical gear assembly 24 may also comprise grounding plates/tabs 701 and 702 as shown in FIG. 2b. The plates/tabs 701 and 702 may be used to create a conductive path for electrical continuity between the drum-cylinder 22 shown in FIG. 1, and the drum ground contact member 703. The ground contact member 703 may provide a path to ground for the photosensitive drum assembly 20, shown in FIG. 1, through a contact on the toner cartridge (not shown) that is in turn grounded to the printing apparatus (not shown). Although the present disclosure refers to the helical gear assembly 24 with grounding plates/tabs 701 and 702, it is to be understood that the present invention may also be applied to helical gear assemblies 28 without any grounding plates/tabs 701 and 702 as shown in FIG. 2c.

Similarly to the drive gear assembly 28 described above, in the original photosensitive drum assembly 20, the drum-cylinder 22 may be crimped to the helical gear assembly 24 using one or more tabs 91 on the drum-cylinder 22 as shown in FIG. 1. It is to be understood that another tab (not shown), similar to tab 91, may be located on the opposite side of the drum-cylinder 22. The one or more tabs 91 may be bent or made to fit into one or more slots 705 in the helical gear assembly 24.

Referring to FIGS. 3a-f and 4a-b, processes for removing the original drive gear assembly 28 and/or the original helical gear assembly 24 from a photosensitive drum assembly 66 are disclosed according to some embodiments.

Figure 3A:
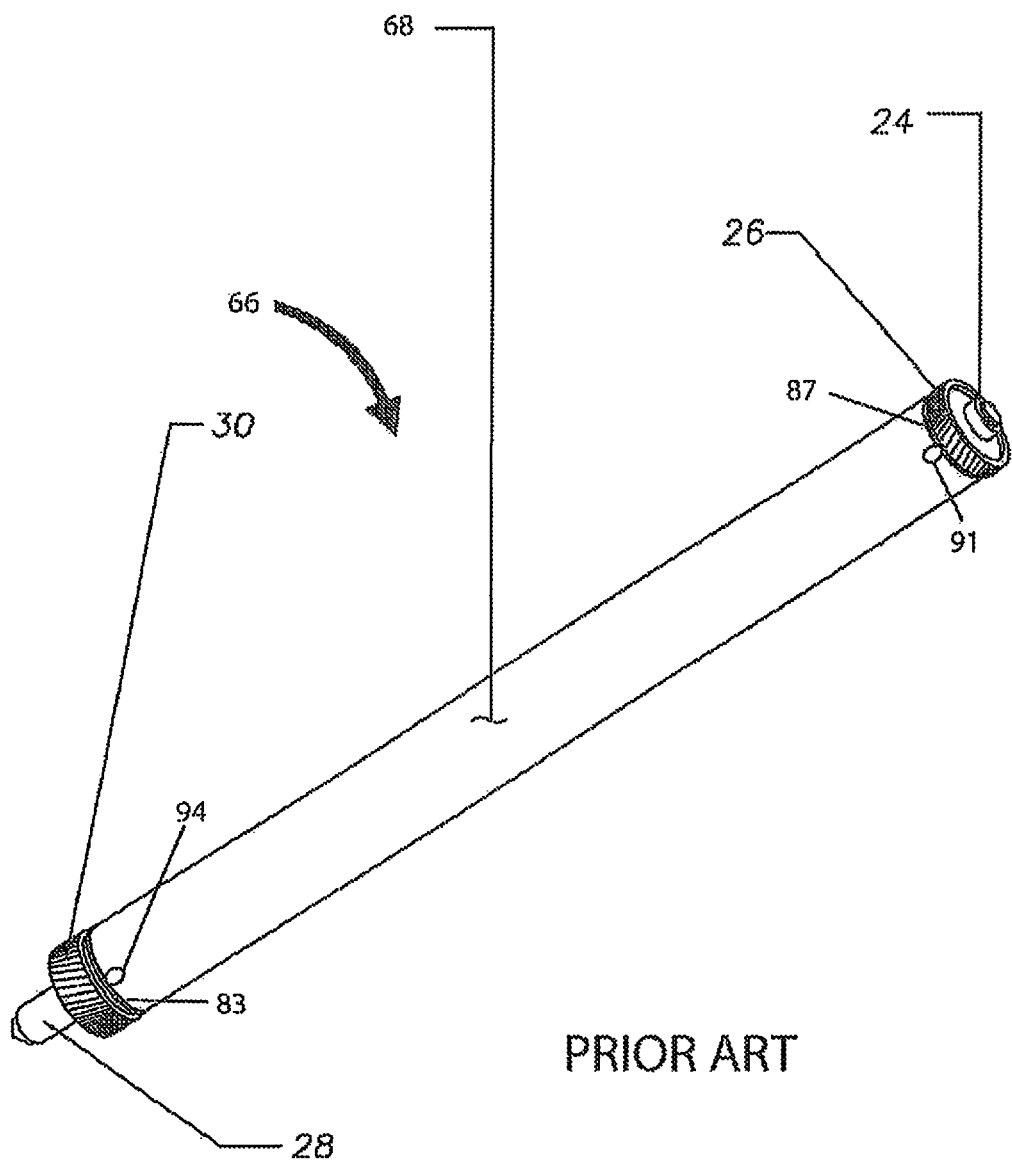
FIG. 3a depicts a perspective view of another prior art photosensitive member assembly.
Figure 3B:
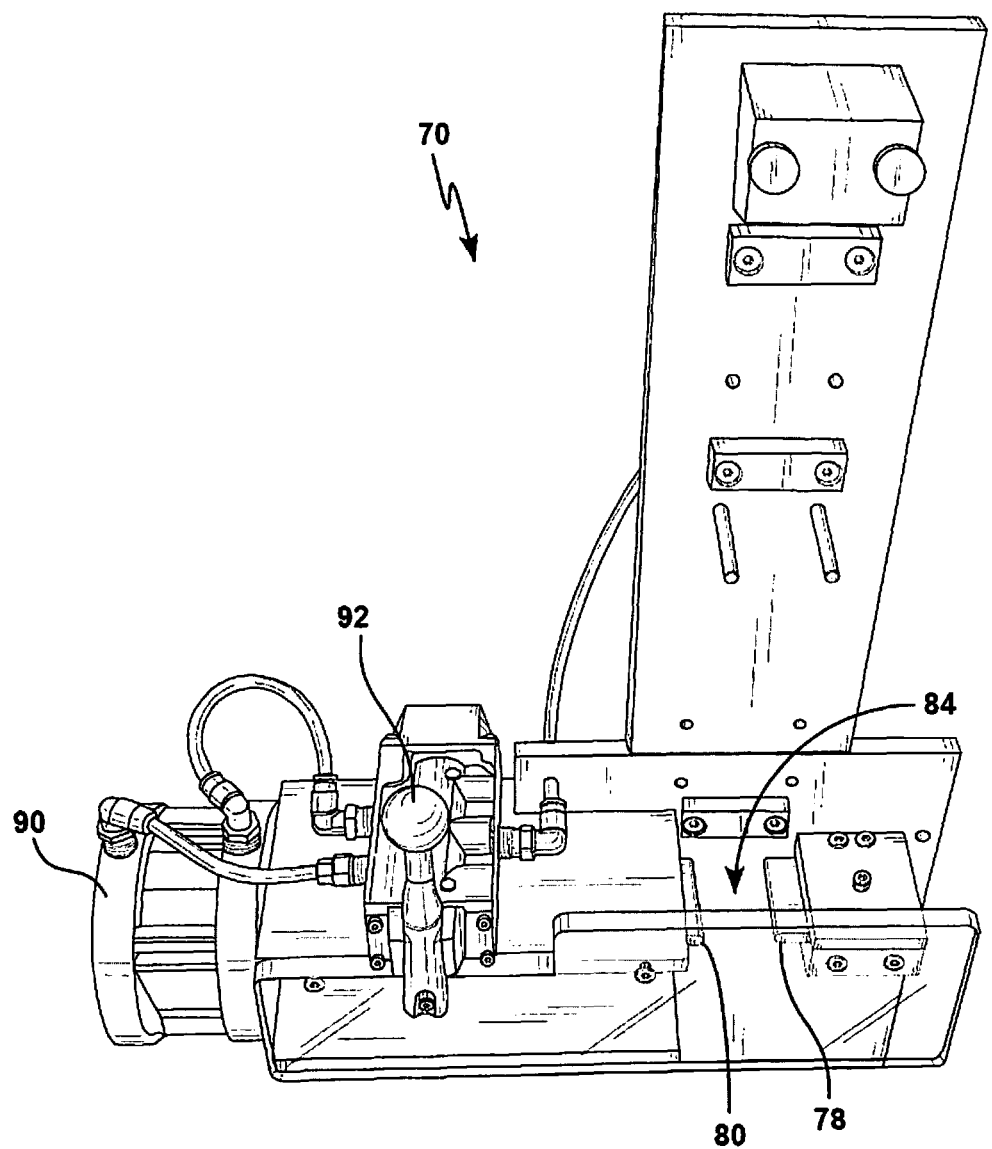
FIGS. 3b-e depict a perspective view of an apparatus according to the present disclosure for removing the drive gear assembly gear from the original photosensitive member assembly.
Figure 3C:
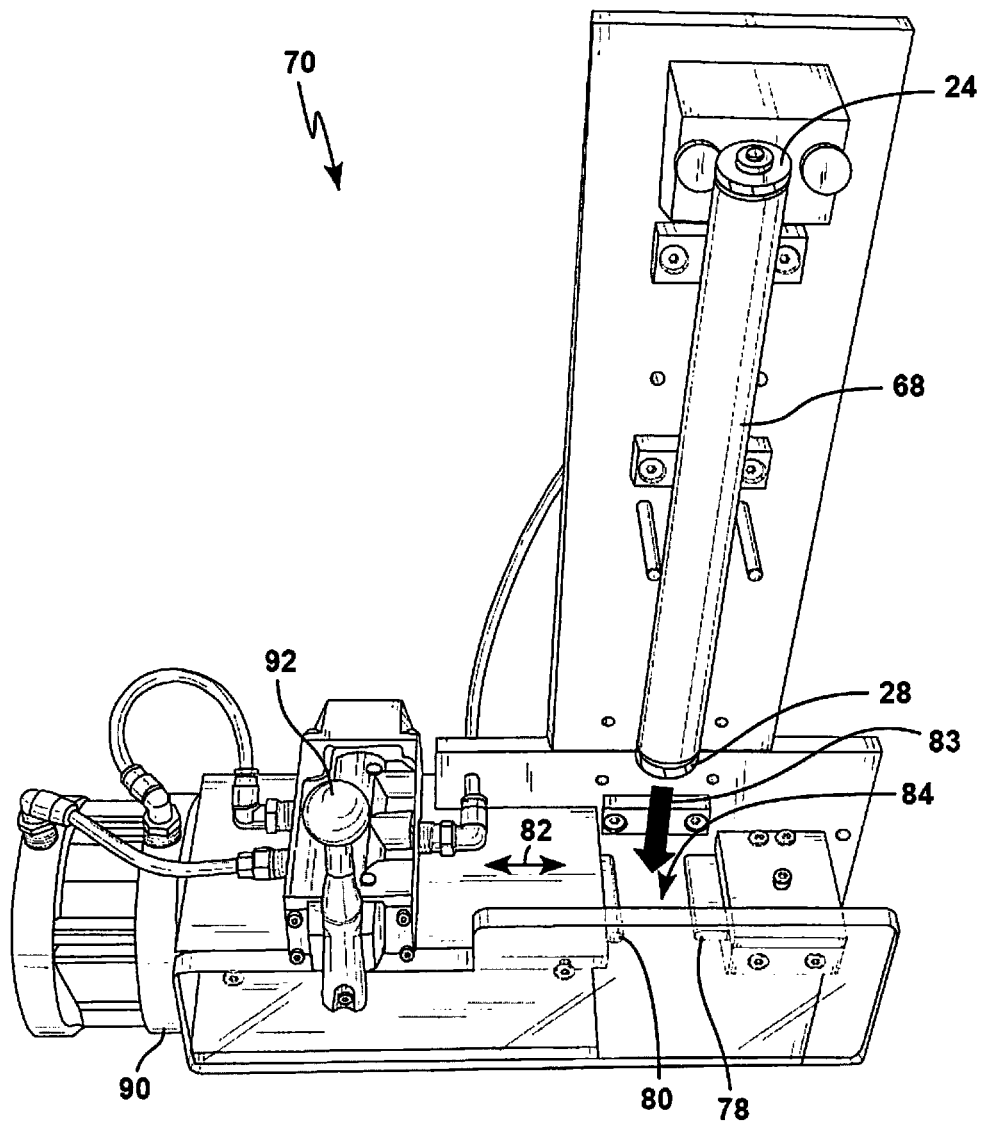
Figure 3D:
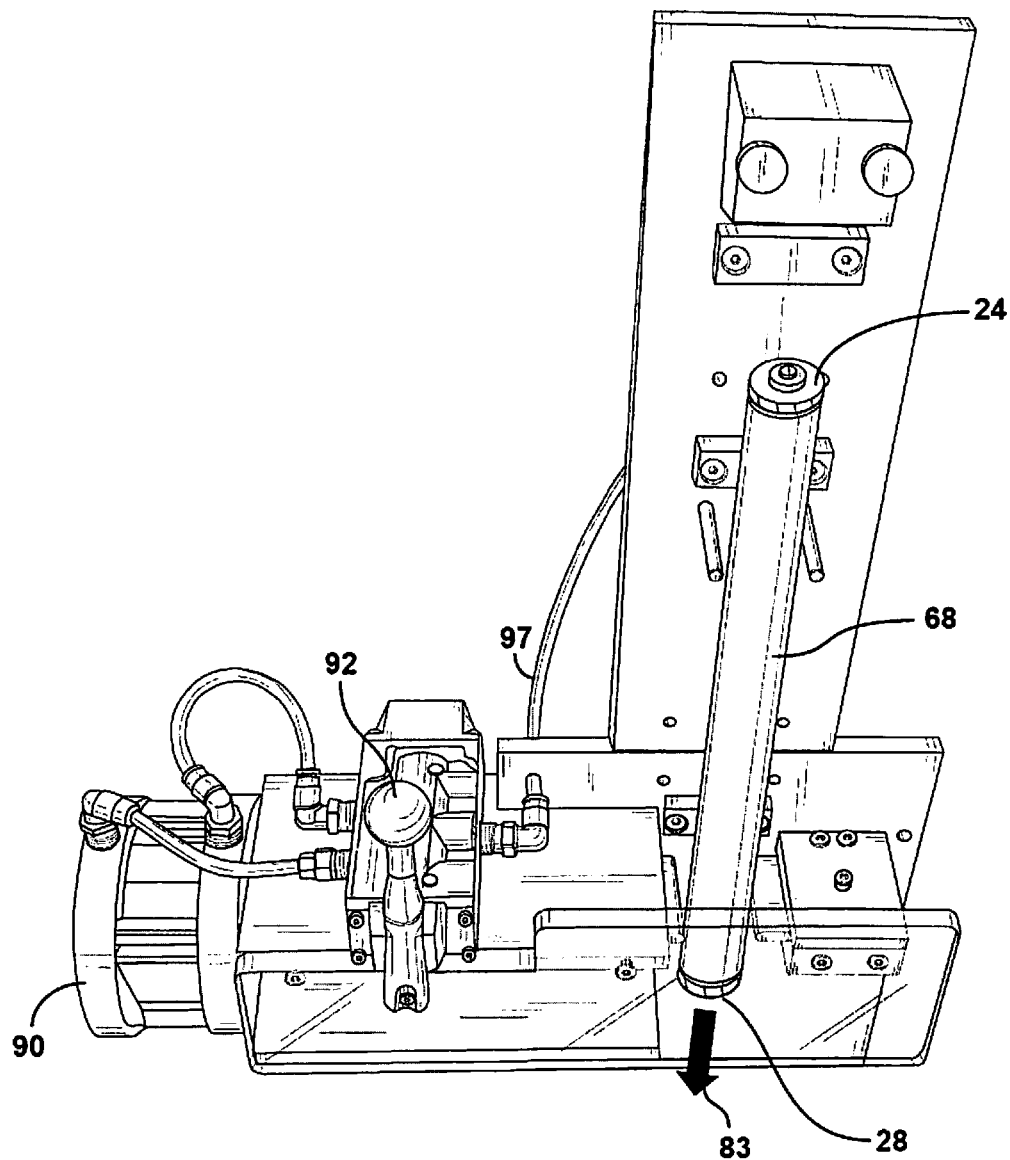

Referring to FIGS. 3b-d, a process for removing the original drive gear assembly 28 from a drum-cylinder 68 using a pneumatic apparatus 70 will be described. The pneumatic apparatus 70 may comprise a stationary wedge 78 and a sliding wedge 80. The sliding wedge 80 may slide back and forth in the directions of the arrow 82 and may have two positions "open" and "close". Once the sliding wedge 80 is in the open position, as shown in FIGS. 3b-d, the drum-cylinder 68 is inserted into an opening 84 (FIG. 3b) as shown by the arrow 83 shown in FIG. 3d. The pneumatic apparatus 70 may also comprise a pneumatic air cylinder 90 configured to drive the sliding wedge 80 in the directions of the arrow 82 to open and close the clamp. The apparatus 70 may also include an air switch 92 configured to move from an "open" position to a "close" position and back to the "open" position as represented by arrow 93. The apparatus 70 may also include a compressed air delivery hose 97 configured to supply compressed air to the air cylinder 90. In order to operate the apparatus 70, the switch 92 has to be on "open" mode (as shown in FIG. 3d). The drum-cylinder 68 is then vertically inserted into the opening 84 in the direction of arrow 83.

Figure 3E:
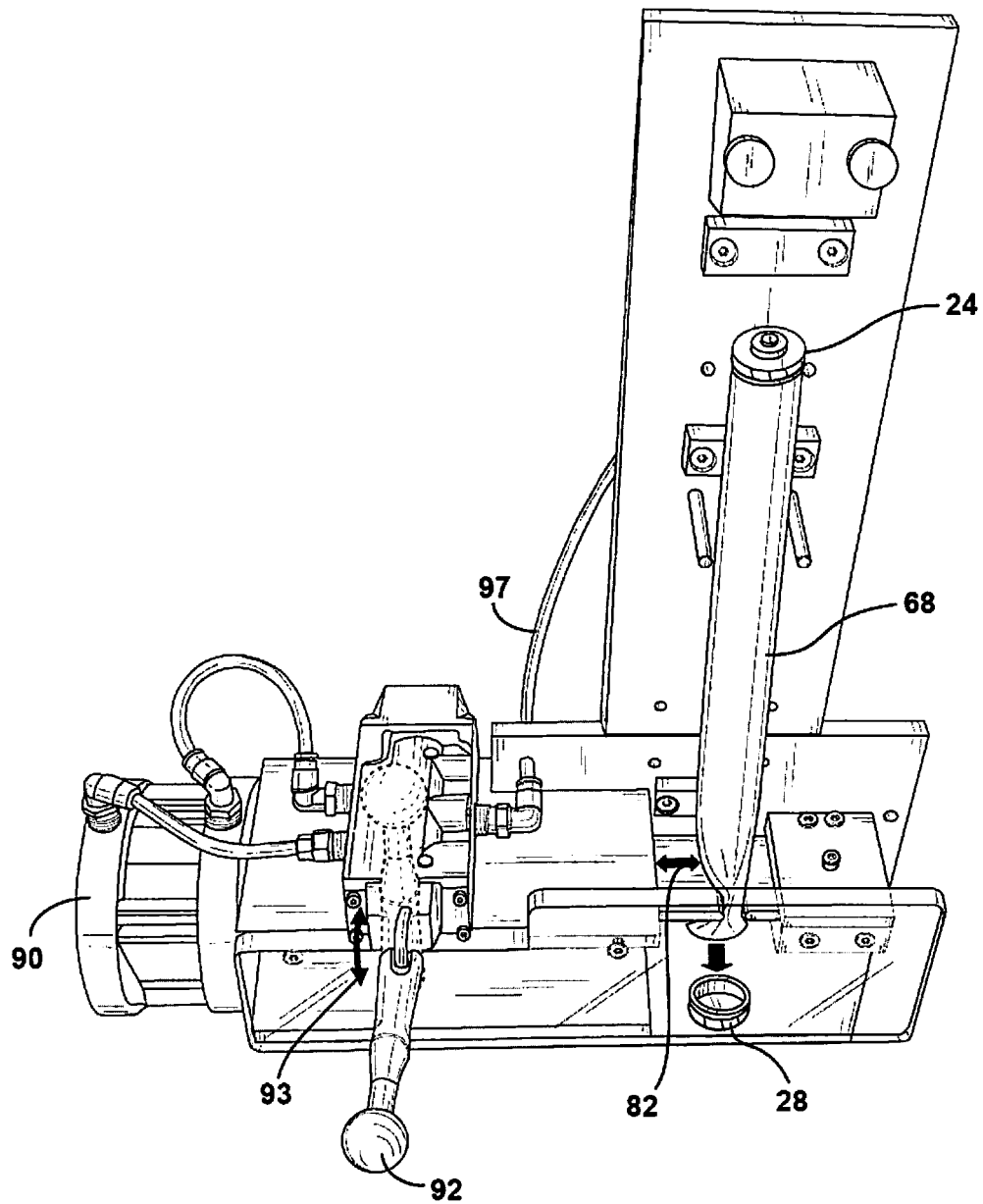
Figure 3F:
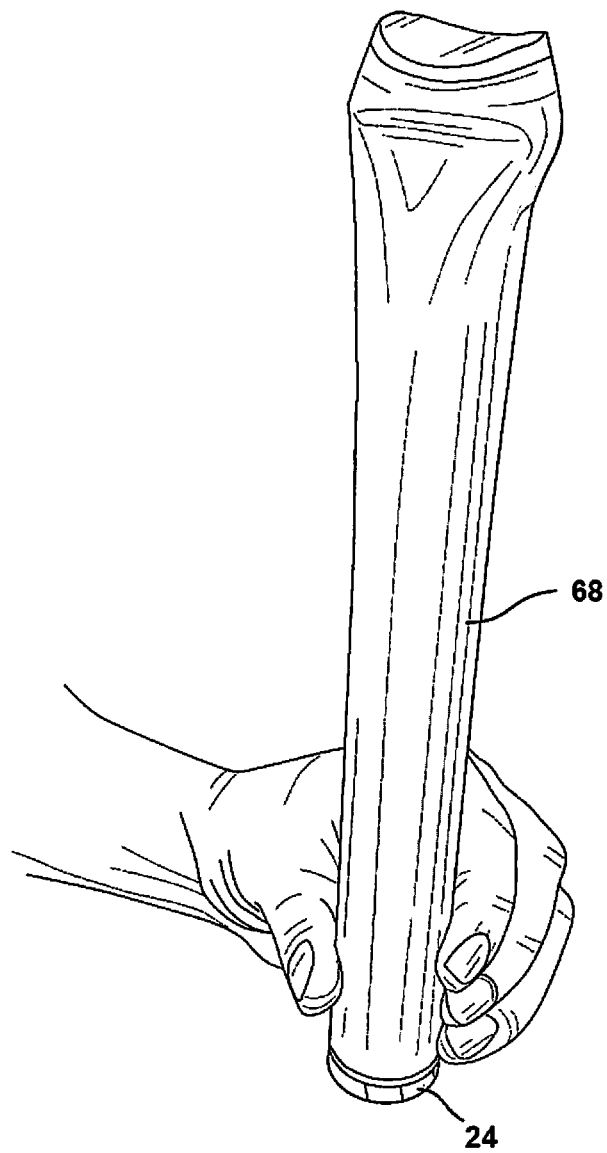
FIG. 3f depicts a perspective view of the drive gear assembly separated from the photosensitive member assembly.

Referring to FIG. 3d, once the drum-cylinder 68 is disposed between the sliding edge 80 and the stationary edge 78, the switch 92 is then actuated or pushed to the "close" position (as shown in FIG. 3e) and the sliding wedge 80 crushes the drum-cylinder 68 (as shown in FIG. 3e-f) thus releasing the drive gear assembly 28 from the drum-cylinder 68.

In another embodiment, the pneumatic apparatus 70 may also be used to remove the helical gear assembly 24 from the drum-cylinder 68 (not shown). In another embodiment, it is to be understood that the pneumatic apparatus 70 may comprise two sliding wedges (not shown) configured to crush the drum-cylinder 68 thus releasing the drive gear assembly 28 and/or the helical gear assembly 24.

Figure 4A:
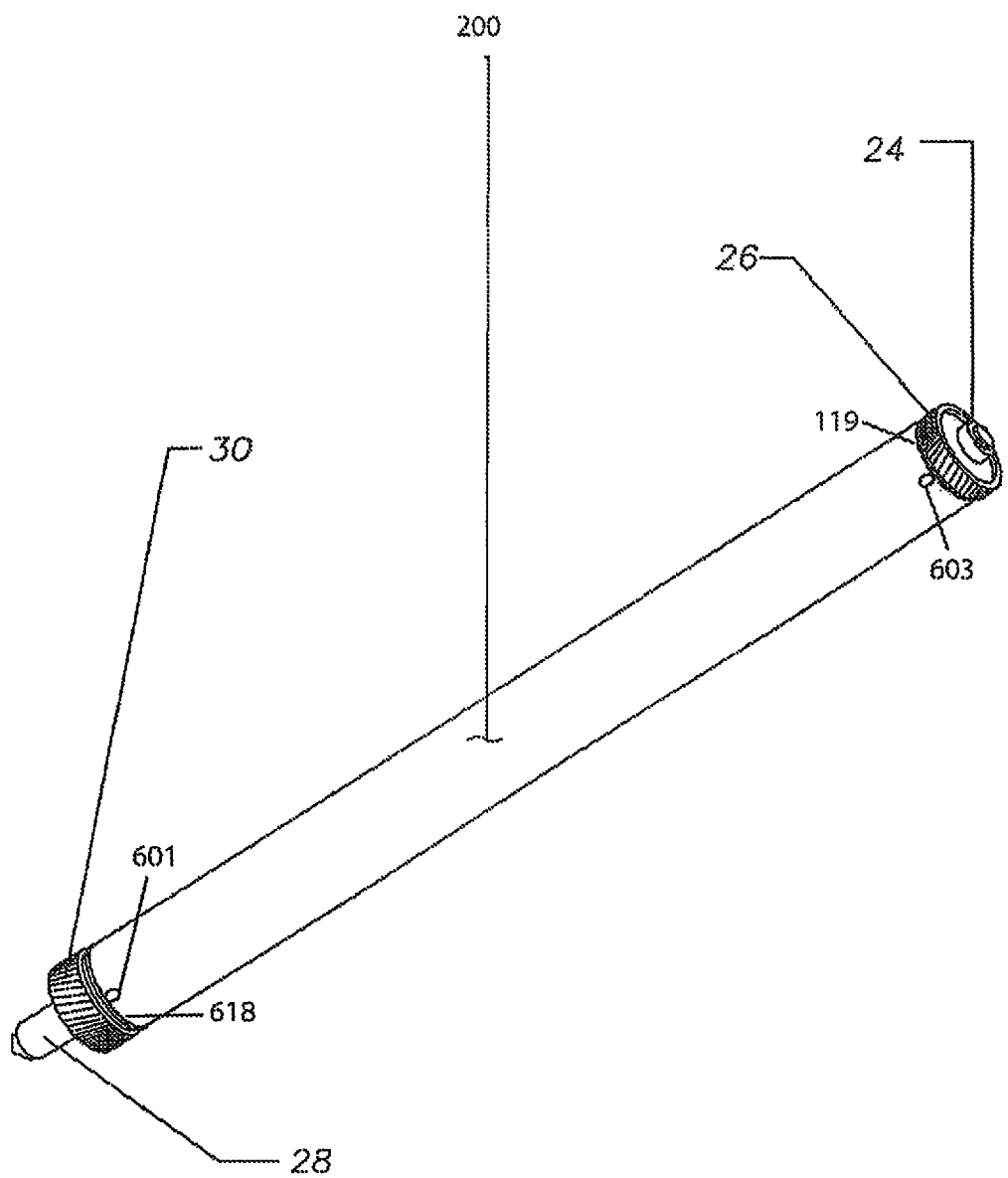
FIG. 4a depicts a perspective view of with the helical gear assembly and the drive gear assembly coupled to a new photosensitive member assembly.

Once the helical gear assembly 24 and/or the drive gear assembly 28 are released from the drum-cylinder 68, the drum-cylinder 68 may be recycled or discarded while the drive gear assembly 28 and/or the helical gear assembly 24 may be re-used with a new drum-cylinder 200 as shown in FIG. 4a.

Figure 4B:
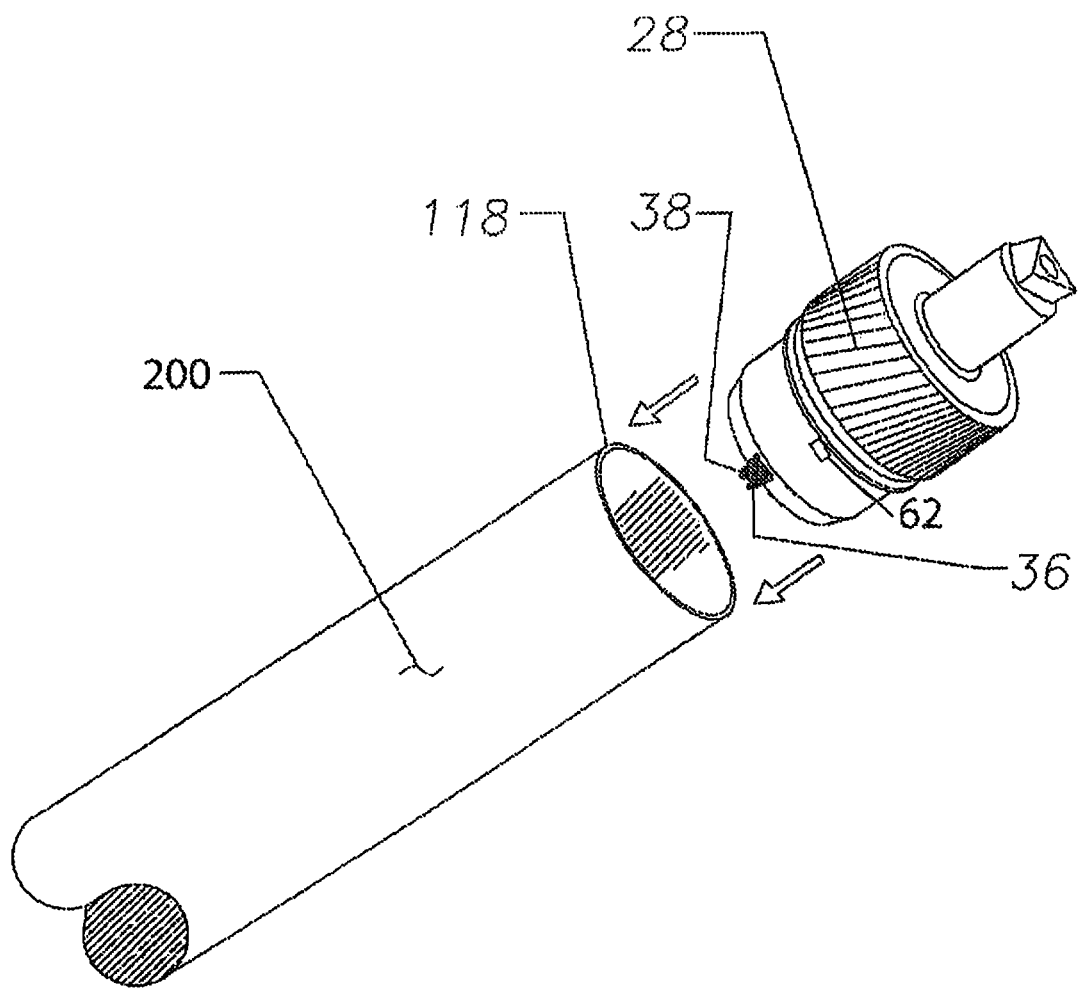
FIG. 4b depicts a perspective view of the orientation of the drive gear assembly and the drum-cylinder before installation.

Referring to FIG. 4a-b, in one embodiment according to the present disclosure, the drive gear assembly 28 may be recycled after being removed from the drum-cylinder 68 by being coupled with a new drum-cylinder 200. To couple the drive gear assembly 28 with the new drum-cylinder 200, the drive gear assembly 28 may be positioned adjacent the end 118 of the drum-cylinder 200 so as to facilitate electrical contact between the tabs 36, 38 and the inner surface of the drum-cylinder 200. Once properly aligned, at least a portion of the drive gear 28 may be inserted into the first end 118 of the new drum-cylinder 200. In one embodiment, the drive gear assembly 28 may be inserted into the first end 118 of the new drum-cylinder 200 until the edge of the first end 118 abuts the limiting rail 60 (FIG. 2a) and the tabs 36, 38 are in electrical contact with the inner surface of the new drum-cylinder 200. Once the drive gear assembly 28 is inserted into the first end 118 of the new drum-cylinder 200, a portion of the new drum-cylinder 200 may be crimped/ bent 601 (FIG. 5a) into the slot 62 of the drive gear assembly 28 to prevent the drive gear assembly 28 from being separated from the new drum-cylinder 200 as the drive gear assembly 28 rotates the new drum-cylinder 200. Although the present disclosure refers to a drive gear assembly 28 with a metal grounding contact plat 34 and tabs 36, 38, 40, 42, it is to be understood that the present invention may also be applied to drive gear assemblies 28 without the metal grounding contact plates 34 and tabs 36, 38, 40, 42.

Figure 4C:
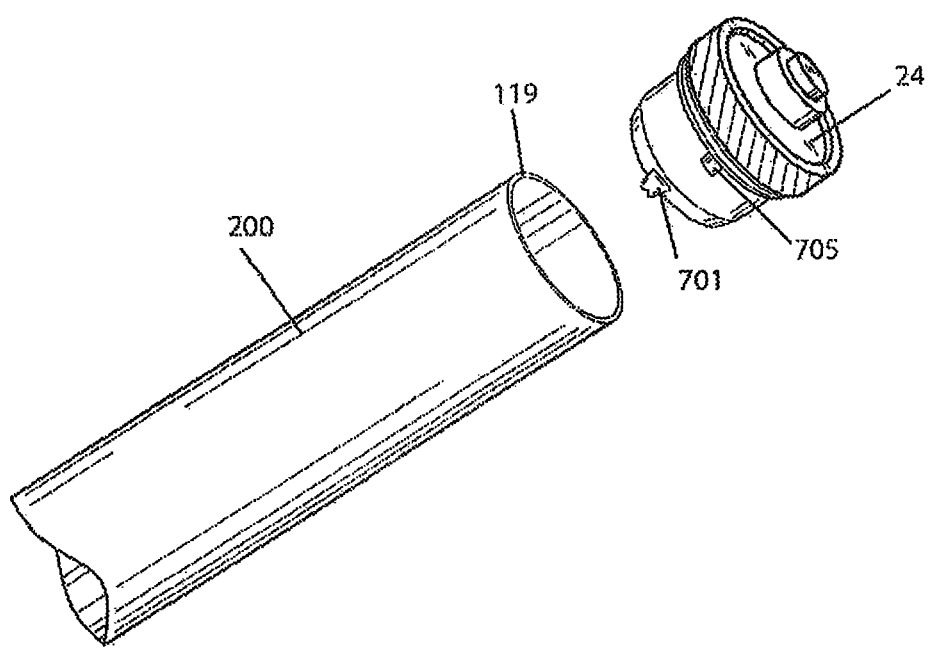
FIG. 4c depicts a perspective view of the orientation of the helical gear assembly and the drum-cylinder before installation.

Referring to FIGS. 4a and 4c, in one embodiment according to the present disclosure, the helical gear assembly 24 may be recycled after being removed from the drum-cylinder 68 by being coupled with a new drum-cylinder 200. To couple the helical gear assembly 24 with the new drum-cylinder 200, the helical gear assembly 28 may be positioned adjacent the end 119 of the drum-cylinder 200 so as to facilitate electrical contact between the tabs 701, 702 (FIG. 2b) and the inner surface of the drum-cylinder 200. Once properly aligned, at least a portion of the helical gear assembly 24 may be inserted into the second end 119 of the new drum-cylinder 200. In one embodiment, the helical gear assembly 24 may be inserted into the second end 119 of the new drum-cylinder 200 until the tabs 701, 702 are in electrical contact with the inner surface of the new drum-cylinder 200. Once the helical gear assembly 24 is inserted into the second end 119 of the new drum-cylinder 200, a portion of the new drum-cylinder 200 may be crimped/bent 603 into the slot 705 of the helical gear assembly 24 to prevent the helical gear assembly 24 from being separated from the new drum-cylinder 200. Although the present disclosure refers to a helical gear assembly 24 with a metal grounding contact plate/tabs 701, 702, it is to be understood that the present invention may also be applied to helical gear assemblies 24 without the metal grounding contact plates/tabs 701, 702 as shown in FIG. 2c.

In one embodiment according to the present disclosure, the drive gear assembly 28 may be inserted into the first end 118 of the new drum-cylinder 200 manually by hand. Similarly, the helical gear assembly 24 may be inserted into the second end 119 of the new drum-cylinder 200 manually by hand. In another embodiment according to the present disclosure, the drive gear assembly 28 and the helical gear assembly 24 may be inserted into the new drum-cylinder 200 using any apparatus as known in the art.

Figure 5A:
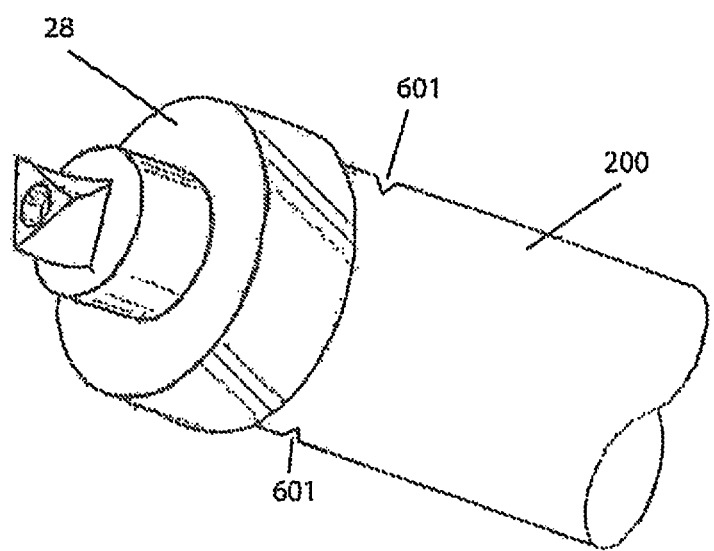
FIG. 5a depicts an embodiment of coupling the drive gear assembly and the new drum-cylinder.

Referring to FIG. 5a, once the drive gear assembly 28 is inserted into the new drum-cylinder 200, a portion of the new drum-cylinder 200 may be crimped/bent 601 on one or more sides to prevent the drive gear assembly 28 from being released from the new drum-cylinder 200 as the drive gear assembly 28 rotates the new drum-cylinder 200. In one embodiment, a portion of the new drum-cylinder 200 may be crimped/bent 601 into the one or more pre-existing slots 62 shown in FIGS. 2 and 4b.

Figure 5B:
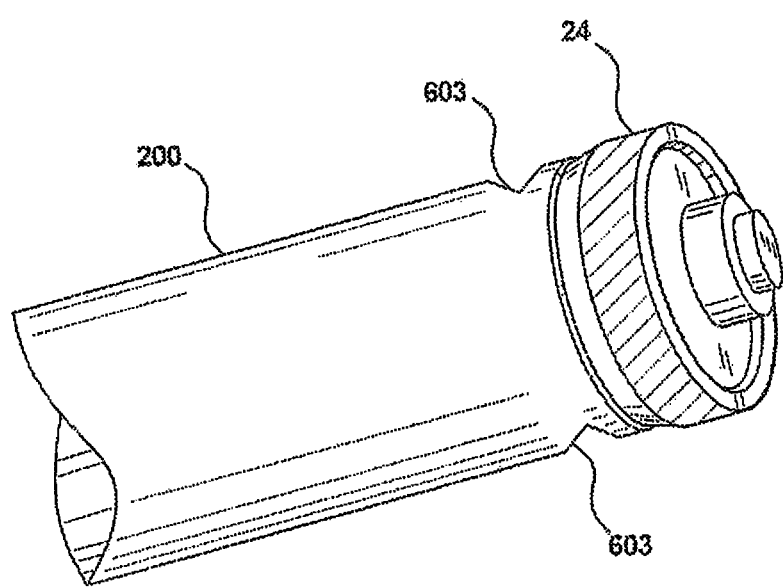
FIG. 5b depicts an embodiment of coupling the helical gear assembly and the new drum-cylinder.

Referring to FIG. 5b, once the helical gear assembly 24 is inserted into the new drum-cylinder 200, a portion of the new drum-cylinder 200 may be crimped/bent 603 on one or more sides to prevent the helical gear assembly 24 from being released from the new drum-cylinder 200. In one embodiment, a portion of the new drum-cylinder 200 may be crimped/bent 603 into the one or more pre-existing slots 705 shown in FIGS. 2b-c.

The new drum-cylinder 200 may be crimped/bent 601, 603 using hand tools or crimping presses as known in the art. In one embodiment according to the present disclosure, the force required to release the drive gear assembly 28 or the helical gear assembly 24 from the new drum-cylinder 200 may be about 5 ft. lbs. of torque or more.

In one embodiment according to the present disclosure, the new drum-cylinder 200 may be crimped/bent 601, 603 using crimping apparatus 610 shown in FIGS. 6a-c and 7.

Figure 6C:
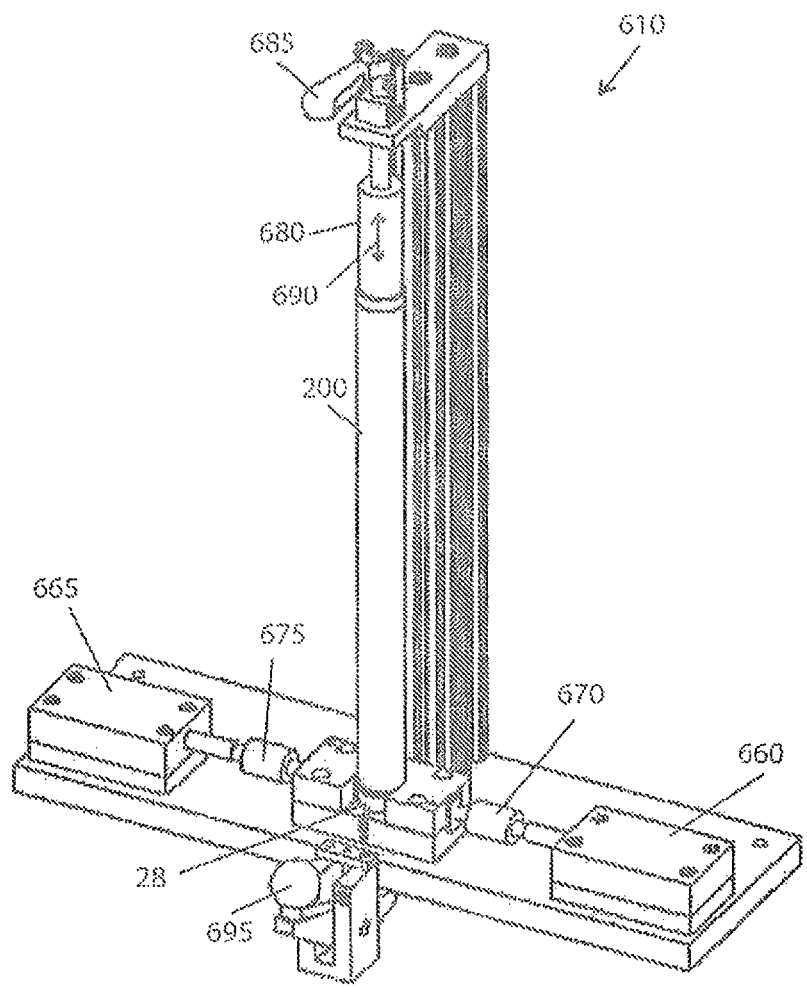
Figure 7:
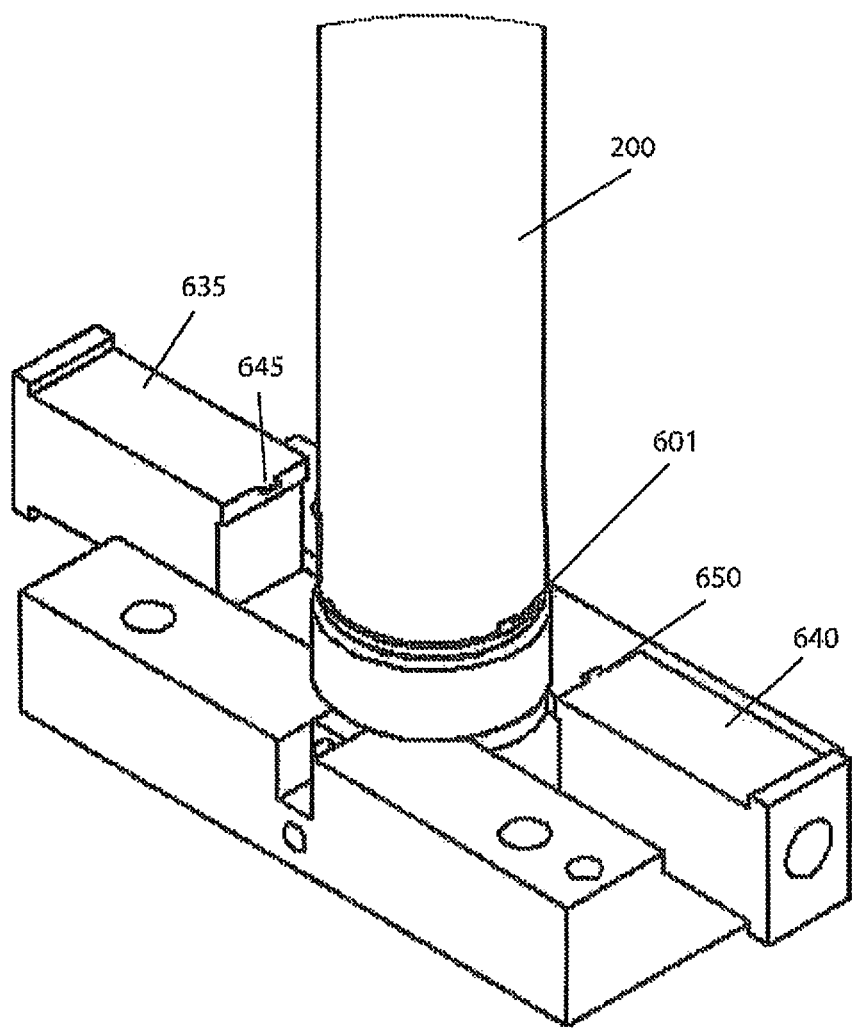

Referring to FIGS. 6a-c and 7, a process according to the present disclosure for coupling the original drive gear assembly 28 to the new drum-cylinder 200 using the crimping apparatus 610 will be described. Referring to FIG. 6b, the crimping apparatus 610 may comprise a holding plate 620 configured to hold a portion of the original drive gear assembly 28; an opening 615 for accommodating the holding plate 620 and accommodating at least a portion of the original drive gear assembly 28 during the coupling process. Because the drive gear assemblies 28 are manufactured in different shapes and sizes, the opening 615 may be configured to accommodate different holding plates 620, wherein each holding plate 620 may be designed to hold/accommodate a specific model and/or shape of the drive gear assembly 28. The holding plate 620 may also have one or more gear rails 630 configured to hold and/or guide the drive gear assembly 28 as it is being inserted into the holding plate 620 and/or as it is being coupled to the new drum-cylinder 200. Referring to FIGS. 6b and 7, the crimping apparatus 610 may also comprise movable arms 635 and 640 each comprising at least one crimping tooth 645 and 650. As the drive gear assembly 28 is placed into the holding plate 620 and the new drum-cylinder 200 is placed over, at least a portion of, the drive gear assembly 28, the movable arms 635 and 640 may be activated to move towards each other so that the crimping teeth 645 and 650 may crimp/bend 601 the drum-cylinder 200 thereby coupling the drum-cylinder 200 to the drive gear assembly 28. In one embodiment, the holding plate 620 may be configured to position the drive gear assembly 28 so as to allow the crimping teeth 645 and 650 to crimp/bend 601 the drum-cylinder 200 into the pre-existing opening/slots 62 as shown in FIG. 4b. In another embodiment the crimping teeth 645 and 650 may be made from hardened steel to prevent breakage.

As stated above, the drive gear assemblies 28 come in different shapes and sizes and may have different size opening/slots 62. In order to accommodate the different drive gear assemblies 28, in another embodiment, the crimping apparatus 610 may be configured to accommodate different movable arms 635 and 640 with different size/shape crimping teeth 645 and 650, wherein different movable arms 635 and 640 may be designed for a specific model and/or shape of the drive gear assembly 28 and/or opening/slots 62.

In another embodiment, the crimping apparatus 610 may use systems 660 and 665 to move the movable arms 635 and 640 towards and away from each other. In one embodiment, the systems 660 and 665 may be mechanical system, where the movable arms 635 and 640 are operated by a manual lever (not shown). In another embodiment, the systems 660 and 665 may be a compressed air system, where the movable arms 635 and 640 are moved with compressed air and/or air pistons 670, 675 as known in the art. In another embodiment, the systems 660 and 665 may be an electric system, where the movable arms 635 and 640 are moved with either motors (not shown) and/or electrical actuators (not shown) as known in the art.

Referring to FIG. 6c, the crimping apparatus 610 may also comprise a holding arm 680 capable of being raised or lowered in the direction of the arrow 690 with, for example, a lever 685. As the drive gear assembly 28 is placed into the holding plate 620 and the new drum-cylinder 200 is placed over, at least a portion of, the drive gear assembly 28, the holding arm 680 may be lowered to hold the drive gear assembly 28 and the drum-cylinder 200 in place during the crimping process. The holding arm 680 may be used to assure that the drum-cylinder 200 does not move and the drive gear assembly 28 is firmly in the holding plate during the crimping process.

Referring to FIG. 6c, the crimping apparatus 610 may also comprise a lever 695 configured to release the drive gear assembly 28 from the holding plate 620 by lowering and raising a drum (not shown) within the opening 615. By lowering the lever 695, the operator of the crimping apparatus 610 may raise the drum (not shown) within the opening 615 there by pushing the drive gear assembly 28 out of the holding plate 620.

Although FIGS. 6a-c depict the crimping apparatus 610 as having two movable arms 635 and 640, in another embodiment the crimping apparatus 610 may have more than two movable arms 635 and 640. The number of movable arms 635 and 640 would depend on the number of crimps/bends 601 required to provide sufficient coupling between the drum-cylinder 200 and the drive gear assembly 28.

In another embodiment, the crimping apparatus 610 may be configured to have and/or operate and/or move only one of the movable arms 635 and 640. In this embodiment, the crimping apparatus 610 would provide only one crimp/bend 601 for coupling the drum-cylinder 200 to the drive gear assembly 28.

Although FIGS. 6a-c and 7 depict and describe the process of coupling the original drive gear assembly 28 to the new drum-cylinder 200, in another embodiment according to the present application, the crimping apparatus 610 may also be use to couple the helical gear assembly 24 to the new drum-cylinder 200. In this embodiment, the crimping apparatus 610 may be configured with moving arms 635 and 640 and holding plate 620 that are configured to accommodate the helical gear assembly 24 instead of the drive gear assembly 28.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

What is claimed is:

1. A method comprising:
   providing an assembly that comprises a first drum-cylinder having an inner periphery surface and a gear assembly, wherein a portion of the gear assembly is in contact with the inner periphery surface; and
   decoupling the gear assembly from the first drum-cylinder by crushing at least a portion of the first drum-cylinder, wherein the drum-cylinder defines a longitudinal axis, and wherein crushing at least a portion of the first drum-cylinder includes crushing the portion of the first drum-cylinder radially inwardly.

2. The method of claim 1, further comprising:
   inserting the portion of the gear assembly into a second drum-cylinder; and coupling the gear assembly to the second drum-cylinder.

3. The method of claim 1, wherein the gear assembly is coupled to the second drum-cylinder having a torque failure value of at least 5 ft. lbs.

4. The method of claim 1, wherein the gear assembly is crimped to the second drum-cylinder.

5. The method of claim 1, wherein the gear assembly is a drive gear assembly.

6. The method of claim 1, wherein the gear assembly is a helical gear assembly.

7. The method of claim 1, wherein the gear assembly is coupled to an end of the drum-cylinder, and wherein crushing at least a portion of the first drum-cylinder includes crushing at least a portion of the first drum-cylinder that is adjacent to the end of the drum-cylinder.

8. The method of claim 1, wherein crushing at least a portion of the first drum-cylinder includes positioning at least the portion of the first drum-cylinder between a first wedge and a second wedge and moving the first wedge toward the second wedge.

9. The method of claim 1, wherein the drum-cylinder is a photosensitive drum-cylinder.

* * * * *